United States Patent
Yip et al.

(10) Patent No.: US 7,689,678 B2
(45) Date of Patent: Mar. 30, 2010

(54) METHOD AND APPARATUS FOR RESTORING THE CONFIGURATION OF A NETWORK DEVICE

(75) Inventors: Michael Yip, Sunnyvale, CA (US); Yeeping Chen Zhong, Milpitas, CA (US)

(73) Assignee: Extreme Networks, Santa Clara, CA (US)

( * ) Notice: Subject to any disclaimer, the term of this patent is extended or adjusted under 35 U.S.C. 154(b) by 729 days.

(21) Appl. No.: 10/133,163

(22) Filed: Apr. 26, 2002

(65) Prior Publication Data

US 2003/0204578 A1 Oct. 30, 2003

(51) Int. Cl.
*G06F 15/177* (2006.01)

(52) U.S. Cl. ...................................... 709/221

(58) Field of Classification Search ......... 709/220–222; 713/1, 100; 379/221.04; 715/523; 714/2, 714/7

See application file for complete search history.

(56) References Cited

U.S. PATENT DOCUMENTS

| | | | |
|---|---|---|---|
| 4,403,303 A | | 9/1983 | Howes et al. |
| 5,548,228 A | | 8/1996 | Madurawe |
| 5,671,355 A | * | 9/1997 | Collins .................. 709/250 |
| 5,961,595 A | | 10/1999 | Kawagoe et al. |
| 6,272,580 B1 | | 8/2001 | Stevens et al. |
| 6,282,640 B1 | * | 8/2001 | Klein ............................ 713/1 |
| 6,463,528 B1 | * | 10/2002 | Rajakarunanayake et al. .. 713/1 |
| 6,539,422 B1 | | 3/2003 | Hunt et al. |
| 6,546,419 B1 | * | 4/2003 | Humpleman et al. ......... 709/223 |
| 6,675,259 B2 | | 1/2004 | Gordon et al. |
| 6,760,761 B1 | * | 7/2004 | Sciacca ...................... 709/220 |
| 6,892,230 B1 | * | 5/2005 | Gu et al. ..................... 709/220 |
| 6,934,853 B2 | * | 8/2005 | Christopherson et al. ...... 707/9 |
| 6,938,079 B1 | * | 8/2005 | Anderson et al. ........... 709/222 |

(Continued)

FOREIGN PATENT DOCUMENTS

EP 1085395 3/2001

(Continued)

OTHER PUBLICATIONS

Landu et al., "Modular Open Network Agent for Control Operations," 1998 IEEE, pp. 600-609.

(Continued)

*Primary Examiner*—Benjamin R Bruckart
*Assistant Examiner*—Benjamin Ailes
(74) *Attorney, Agent, or Firm*—Blakely, Sokoloff, Taylor & Zafman LLP

(57) ABSTRACT

A method and apparatus is provided to restore the configuration of a network device. A configuration manager in a network device saves a version of the configuration of the network device by storing the configuration data in an format that conforms to a standard markup language such as the extended markup language (XML). The format includes a sequence of corresponding tags and values that represent the content of the internal data structures in the memory of the router that comprise the saved version of the configuration. At the time of restoration, an parser is used to parse the values from the tags and the configuration manager restores the contents of the internal data structures in the memory of the router to the parsed values in accordance with the corresponding tags.

14 Claims, 6 Drawing Sheets

U.S. PATENT DOCUMENTS

| | | | |
|---|---|---|---|
| 6,944,759 B1* | 9/2005 | Crisan | 713/100 |
| 7,031,941 B2* | 4/2006 | Garrow et al. | 705/50 |
| 7,032,014 B2* | 4/2006 | Thiyagarajan et al. | 709/220 |
| 7,047,292 B1 | 5/2006 | Stewart et al. | |
| 7,054,924 B1* | 5/2006 | Harvey et al. | 709/220 |
| 7,065,562 B2* | 6/2006 | Courtney | 709/220 |
| 7,130,895 B2* | 10/2006 | Zintel et al. | 709/220 |
| 7,131,066 B1* | 10/2006 | Birsan et al. | 715/523 |
| 7,200,548 B2* | 4/2007 | Courtney | 703/27 |
| 7,213,139 B2* | 5/2007 | Zhang | 713/1 |
| 7,266,084 B2* | 9/2007 | Suonsivu et al. | 370/252 |
| 2001/0027442 A1 | 10/2001 | Krahn et al. | |
| 2002/0029276 A1 | 3/2002 | Bendinelli et al. | |
| 2002/0035621 A1* | 3/2002 | Zintel et al. | 709/220 |
| 2002/0099972 A1 | 7/2002 | Walsh et al. | |
| 2002/0161883 A1 | 10/2002 | Matheny et al. | |
| 2002/0169858 A1* | 11/2002 | Bellinger et al. | 709/220 |
| 2003/0006995 A1 | 1/2003 | Smith et al. | |
| 2003/0009550 A1 | 1/2003 | Taylor et al. | |
| 2003/0023707 A1* | 1/2003 | Ryan | 709/220 |
| 2003/0069956 A1 | 4/2003 | Gieseke et al. | |
| 2003/0074435 A1 | 4/2003 | Hobbs | |
| 2003/0074436 A1 | 4/2003 | Gieseke | |
| 2003/0115299 A1 | 6/2003 | Froyd et al. | |
| 2006/0155833 A1* | 7/2006 | Matsuda et al. | 709/220 |
| 2006/0190575 A1* | 8/2006 | Harvey et al. | 709/222 |

FOREIGN PATENT DOCUMENTS

| | | |
|---|---|---|
| JP | 11252076 | 9/1999 |
| JP | 2000-090028 | 3/2000 |
| JP | 2000122952 | 4/2000 |
| JP | 2001-148706 | 5/2001 |
| JP | 200257668 | 2/2002 |
| WO | WO 01/75634 A1 | 11/2001 |

OTHER PUBLICATIONS

Feridun et al., "Distributed Management with Mobile Components," IBM Research Report, Feb. 1999, pp. 857-870, XP002158233.

"Design for a Simple Network Management Protocol Subagent for Internet Firewalls," IBM Technical Disclosure Bulletin, vol. 40, No. 3, Mar. 1997, pp. 63-68; XP000694517.

Notice of Reasons for Refusal from Japanese Patent Application No. 2003-119528 mailed Apr. 22, 2008, 3 pgs.

Office Action from U.S. Appl. No. 10/132,946 mailed Aug. 9, 2005, 10 pgs.

Final Office Action from U.S. Appl. No. 10/132,946 mailed Jan. 30, 2006, 9 pgs.

Office Action from U.S. Appl. No. 10/132,946 mailed Jun. 15, 2006, 9 pgs.

Final Office Action from U.S. Appl. No. 10/132,946 mailed Aug. 16, 2007, 13 pgs.

Office Action from U.S. Appl. No. 10/132,946 mailed Jan. 9, 2008, 11 pgs.

Final Office Action from U.S. Appl. No. 10/132,946 mailed Aug. 21, 2008, 15 pgs.

Notice of Reasons for Refusal from Japanese Patent Application No. 2003-119523 mailed May 20, 2008, 3 pgs.

"System Operation and Management", SunWorld, vol. 10, No. 11, Nov. 1, 2000, Kabushiki Kaisha IDG Japan, 7 pgs.

Non-Final Office Action for U.S. Appl. No. 10/132,946 Mailed Dec. 12, 2008, 12 pages.

Translation of Second Notice of the Reason for Refusal mailed Mar. 17, 2009 for Japanese Patent Application No. 2003-119523.

Final Office Action for U.S. Appl. No. 10/132,946, Mailed Jun. 30, 2009, 15 pages.

Non-Final Office Action for U.S. Appl. No. 10/133,163, Mailed Aug. 13, 2008.

European Search Report for EP Application No. 03291019.2 mailed Jan. 8, 2010, 3 pages.

* cited by examiner

METHOD AND APPARATUS FOR RESTORING THE CONFIGURATION OF A NETWORK DEVICE

TECHNICAL FIELD

The present invention relates to the field of network management. In particular, the present invention relates to restoring the configuration of a network device.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2002, Extreme Networks, Inc., All Rights Reserved.

BACKGROUND AND RELATED ART

The architecture of high-performance Internet routers has advanced in the last several years to provide increased performance in routing ever-greater volumes of network traffic. It is not uncommon for a router to support numerous protocols as well as several control applications for configuration and maintenance of the router tables, protocols, and network policies. These advances have increased the complexity of the router such that the efficient management of the router's configuration is critical for reliable network performance.

The configuration of a router is typically managed by a centralized configuration database residing on the router. The contents of the configuration database are reflected in the contents of internal data structures in memory that control the operation of the router. Manipulation of the contents of the configuration database and the internal data structures are accomplished with various commands entered using a management interface, such as a command line interface (CLI). Other management interfaces to the configuration of the router include the Simple Network Management Protocol (SNMP), as well as XML-based network management interfaces that use XML to encode configuration data entered by a network administrator via a graphical user interface (GUI), and transmit the data to the configuration database.

Because the configuration of the router is so complex and so volatile, it is important to store the current state of the configuration of the router at a given point in time on a non-volatile storage medium so that the router can be restored without having to re-enter all of the various commands that were used to generate the configuration. In the past the contents of the internal data structures in memory were stored in a binary data file that could be used to quickly restore the memory of the router to the stored configuration. However, the binary data file was not user-friendly as it was not human-readable, and therefore not easily edited. Network administrators had difficulty using the binary files to restore their routers, and often had to prevail upon the network device vendors to provide assistance.

In an effort to overcome this problem, network device vendors began eliminating the binary data files, and replaced them with text-based files in the American Standard Code for Information Interchange (ASCII) format. ASCII is the most common format for text files in computers and on the Internet. In an ASCII file, each alphabetic, numeric, or special character is represented with a 7-bit binary number (a string of seven 0s or 1s). In all, 128 possible characters are defined.

Instead of storing the current state of the configuration from the internal data structures in memory as was done with the binary data files, the vendors use the ASCII text files to store all of the commands that were entered to generate the configuration reflected in the contents of the internal data structures in memory. For example, the ASCII text files might contain various CLI, SNMP, XML, or other types of configuration commands used to generate the configuration of the router. While this provides a way to restore the configuration of the router that is more user-friendly and easier to edit, it also lengthens the amount of time to restore the configuration. For example, the amount of time to restore a typical router from an ASCII text file of configuration commands is often more than four or five hours, because the router has to process each of the various commands in order, just as when the commands were initially entered. Lengthy restoration times are unacceptable for today's 24/7 networks.

SUMMARY

According to one aspect of the invention, a method and apparatus is provided to restore the configuration of a network device. A configuration manager in a network device saves a version of the configuration of the network device by storing the configuration data in a format that conforms to a standard markup language such as the extended markup language (XML). The format includes a sequence of corresponding tags and values that represent the content of the internal data structures in the memory of the router that comprise the saved version of the configuration. At the time of restoration, a parser is used to parse the values from the tags and the configuration manager restores the contents of the internal data structures in the memory of the router to the parsed values in accordance with the corresponding tags.

In accordance with these and other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
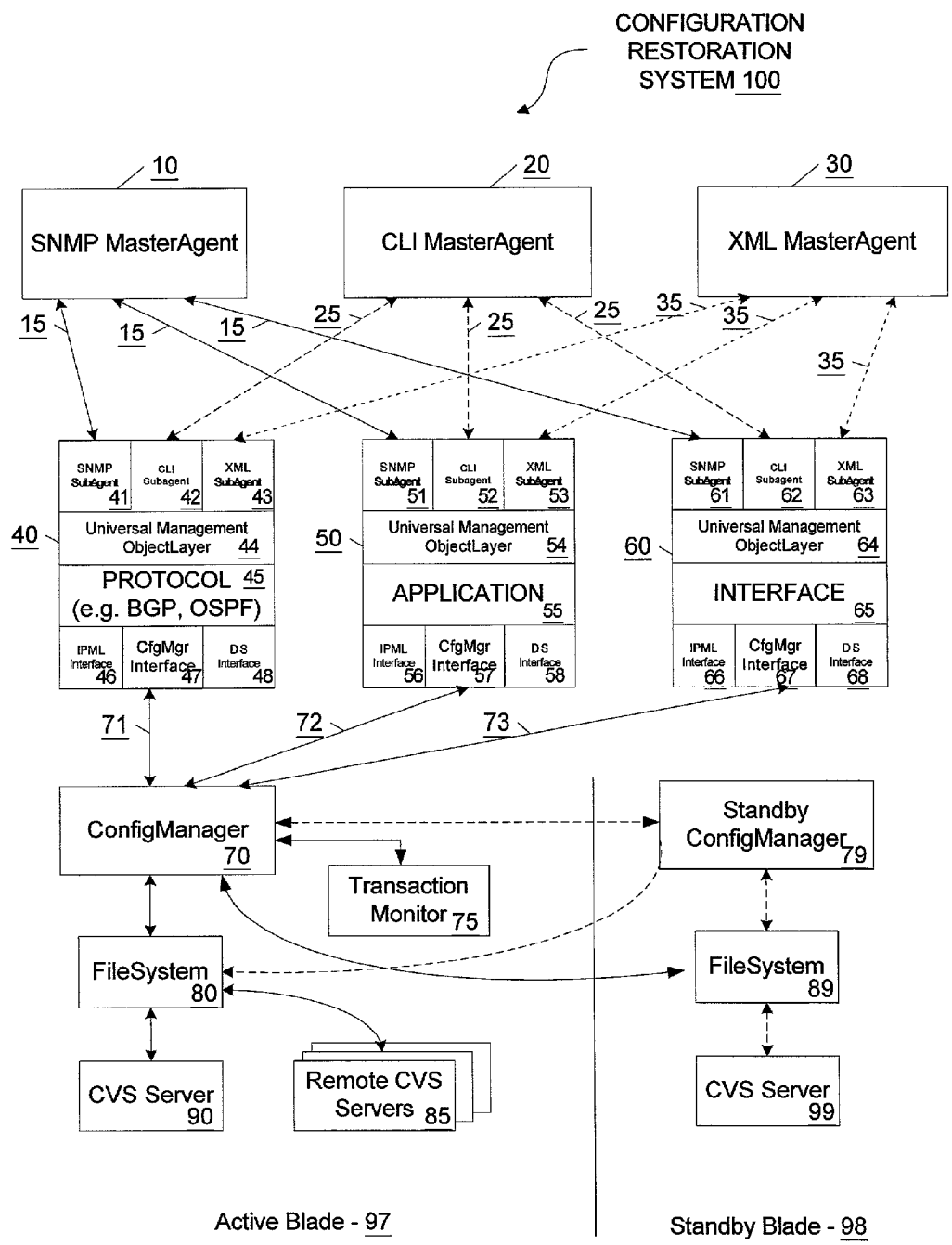
FIG. 1 is a block diagram illustrating one generalized embodiment of a configuration restoration system incorporating the invention, and the operating environment in which certain aspects of the illustrated invention may be practiced.

In the following description various aspects of the present invention, a method and apparatus to restore the configuration of a network device will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a switch, router, bridge, server or gateway, as a software routine, hardware circuit, firmware, or a combination thereof.

Parts of the description will be presented using terminology commonly employed by those skilled in the art to convey the substance of their work to others skilled in the art, including terms of operations performed by a network operating system, and their operands, such as transmitting, receiving, routing, packets, messages, tables, command, message information base, command trees, tags and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

It should be noted that while the description that follows addresses the method and apparatus as it applies to a network device such as a router, or layer 3 switch, it is appreciated by those of ordinary skill in the art that method is generally applicable to any packet forwarding device, including a bridge, or layer 2 switch, server or gateway. It should also be noted that while the method and apparatus may be discussed in the context of a local area network (LAN), the present invention may also be used in the context of other Transport Control Protocol/Internet Protocol (TCP/IP)-based networks including, but not limited to, internetworks, Virtual Local Area Networks (VLANs), Metropolitan Area Networks (MANs), and Wide Area Networks (WANs), as well as networks organized into subnets.

FIG. 1 is a block diagram illustrating one generalized embodiment of a configuration restoration system incorporating the invention, and the operating environment in which certain aspects of the illustrated invention may be practiced.

As illustrated, the configuration restoration system 100 operates on a router that has a configuration manager 70.

The configuration manager 70 operates in conjunction with a transaction monitor 75, file system 80, a concurrent versions system (CVS) server 90, and one or more remote CVS servers 85 to maintain the router's configuration data. The configuration data includes the currently running configuration and the last saved configuration. The currently running configuration is stored in volatile memory on the router, whereas the saved configuration is stored in non-volatile memory or other permanent storage medium using the file system 80. The configuration manager 70 further maintains a particular version of the configuration data in non-volatile memory using the CVS server 90 and remote CVS servers 85 to provide version control. The operation of the configuration manager 70 is described in a commonly assigned co-pending application entitled "Method and Apparatus for Dynamic Configuration of a Router," U.S. patent application Ser. No. 10/132,946, which is herein incorporated by reference.

During operation, the configuration manager 70 uses the transaction monitor 75 to buffer and control multiple updates to the configuration data to preserve its integrity. The last saved version of the configuration data (or other backup version of the configuration data) is replicated on a standby blade 98 that has a standby configuration manager 79 and standby file system 89, as well as a standby CVS server 99.

A typical router supports a number of applications that support protocols, network interfaces, and other components, the operations of which are controlled in accordance with the currently running configuration as maintained by configuration manager 70. For example, in the illustrated embodiment, the router includes applications to support the Border Gateway Protocol (BGP) 40, the Open Shortest Path First protocol (OSPF) 50, and an Ethernet Interface 60.

Each application may also support one or more management interfaces, such as CLI, SNMP, or XML-based management interfaces. The management interfaces provide network administrators with access to the functions of the router and router applications using CLI commands, or SNMP or XML requests to update or access the configuration.

In one embodiment, rather than being incorporated into the application, the management interfaces to the router's functions, applications, and resulting configuration are carried out using a master agent/subagent scheme. The master agent/subagent scheme is a technique to allow a user to perform per-variable multiplexing in a dynamic fashion. For example, the scheme permits an application to activate a subagent to dynamically register leaves into a master agent's command tree, or to register other information that controls the master agent's operations. The master agent is an independent process, such as a daemon, that receives, sends, and is capable of validating the management interface input data before passing it to the subagent via a communications channel 15/25/35 using a common messaging interface. The subagent is also an independent process, such as a thread, that is generated by and directly interfaces with the application layer 40/50/60. The application layer 40/50/60 has many components, including the application itself 45/55/65, which operates in conjunction with a universal management object layer (UMOL) 44/54/64 to map the commands, requests, or messages exchanged via the master agent/subagent scheme into a common internal data structure. In one embodiment the common internal data structure is composed of actions and parameters.

In one embodiment, the application operates in conjunction with a configuration management interface 47/57/67 to pass the actions and parameters generated in accordance with the UMOL common internal data structure to the configuration manager 70 over a communications channel 71/72/73 using the common messaging interface. The configuration manager 70 coordinates the processing of updating the configuration by periodically requesting from each registered application, the configuration data—the actions and parameters—that need to be accessed or updated. The configuration manager 70 carries out the actions in accordance with the parameters, and in accordance with an application sequencing scheme that was established at registration time. The configuration manager 70 further passes responses to the actions and parameters, if any, back to the application via the configuration management interface 47/57/67 and over the communications channel 71/72/73 using the common messaging interface.

By using the master agent to isolate the application layer's components from the management interface and the configuration manager interface 47/57/67 to isolate the configuration manager 70 from the application layer components, the router's configuration can be more easily managed and dynamically updated.

In one embodiment, the configuration manager 70 saves the existing versions of the configuration data at runtime in an XML-formatted file using the file system 80. The XML-formatted file includes a sequence of tags and values that identify and describe the format and values of the common internal data structures in the memory of the router as mapped by the UMOL 44/54/64. The common internal data structures comprise the configuration data, the contents of which represent the configuration of the router.

Figure 2:
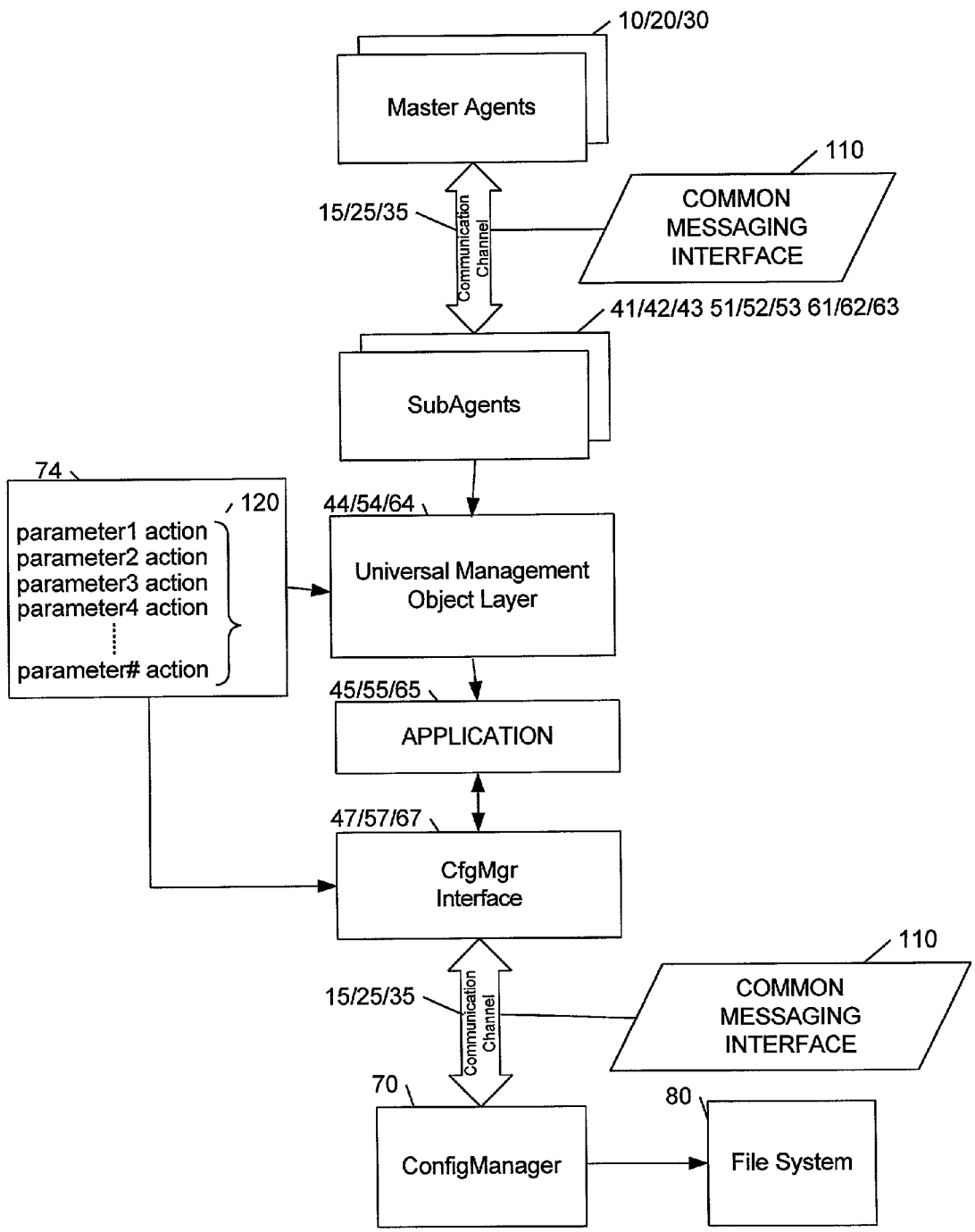
FIG. 2 is a block diagram illustrating selected components of the configuration restoration system of FIG. 1 in further detail, in accordance with one embodiment of the present invention.

FIG. 2 is a block diagram illustrating the operation of the configuration manager 70 of FIG. 1 in further detail. In one embodiment, the master agents 10/20/30 and subagents 41/42/43/51/52/53/61/62/63 exchange configuration management information using a common messaging interface 110 and communications channel 15/25/35. A UMOL 44/54/64 interfaces with the subagents 41/42/43/51/52/53/61/62/63 and applications 45/55/65 to map the configuration management information to a common internal data structure 74. The applications 45/55/65 operate in conjunction with the configuration management interfaces 47/57/67 to issue actions and parameters 120 generated in accordance with the UMOL's common internal data structure 74. The configuration management interfaces 47/57/67 send the actions and parameters 120 to the configuration manager 70 using the common messaging interface 110 and communications channel 71/72/73. In one embodiment the communications channels 15/25/35 and 71/72/73 may be inter-process communication channels (IPC). However, other types of communication channels may be used, such as transmission control protocol (TCP) channels or sockets, without departing from the scope of the invention. As noted earlier, the configuration manager 70 operates in conjunction with the file system 80 and other components to maintain the router's configuration data, including storing the currently running configuration in a last saved configuration comprising an XML-formatted file, and restoring the currently running configuration from the last saved configuration using the XML-formatted file, the operation of which is described in further detail in the figures that follow.

Figure 3:
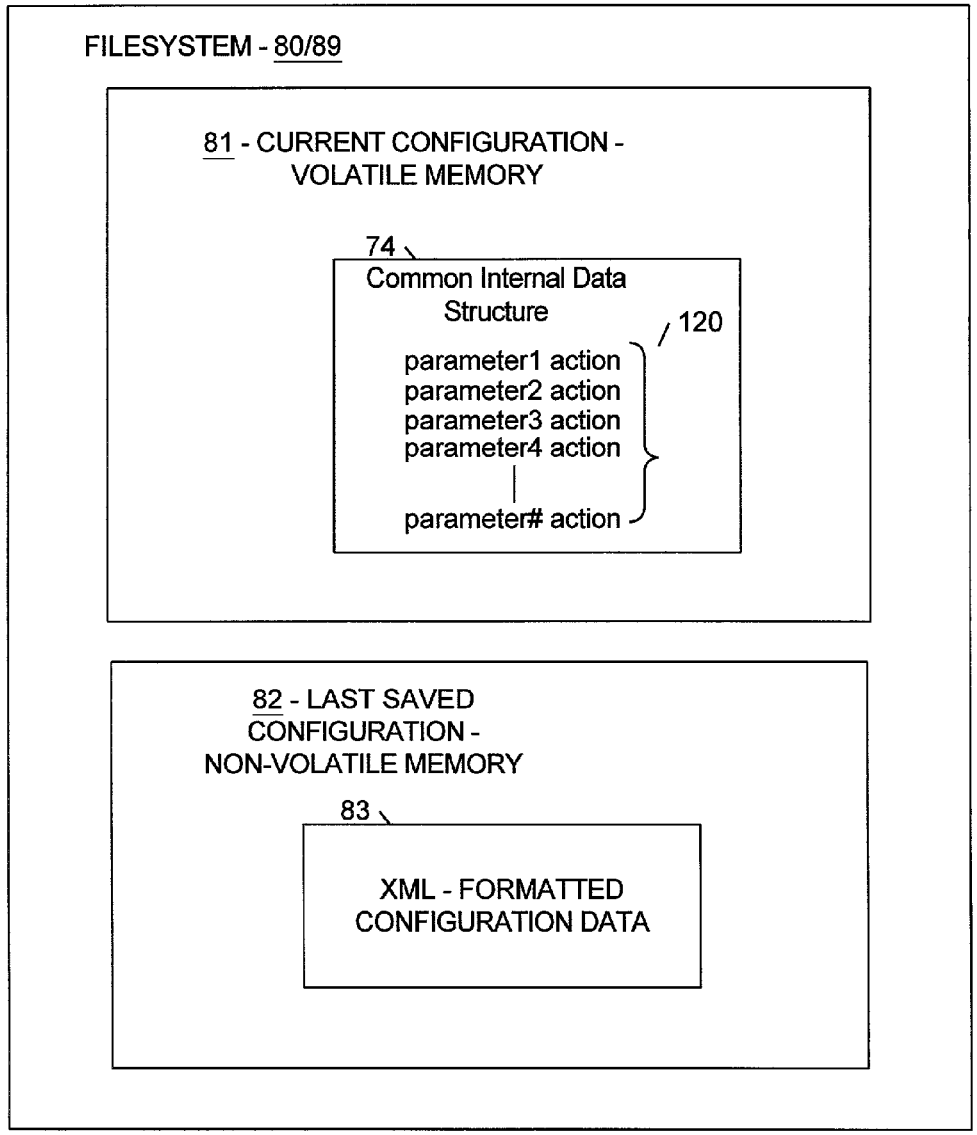
FIG. 3 is a block diagram illustrating selected components of the configuration restoration system of FIG. 1 in further detail, in accordance with one embodiment of the present invention.

FIG. 3 is a block diagram illustrating selected components of the configuration restoration system 100 of FIG. 1 in further detail, in accordance with one embodiment of the present invention. The file system 80/89 includes a current configuration 81 stored in a volatile memory, and a last saved configuration 82, stored in non-volatile memory.

In one embodiment, the current configuration 81 comprises parameters and actions 120 in a common internal data structure 74. The common internal data structure 74 is typically device-specific, i.e., it is a proprietary data structure that will vary depending on the type of network device and the vendor of the network device.

In one embodiment, the last saved configuration comprises XML-formatted tags and values 83 that represent the content of the last saved configuration as previously stored by the configuration manager 70 from then-current configuration data. Unlike the common internal data structure 74, the XML-formatted tags and values 83 are not device or vendor-specific, i.e., the tags and values conform to the standardized XML markup language. Besides being standard, one of the advantages of storing the configuration data in the XML-formatted file is that the configuration data is easier for network administrators to read, understand, and edit as needed.

In operation, the XML-formatted tags and values 83 are used to quickly restore the current configuration data from the last saved configuration data. Specifically, the XML tags and values 83 are used to re-populate the corresponding data in the common internal data structures 74.

Figure 4:
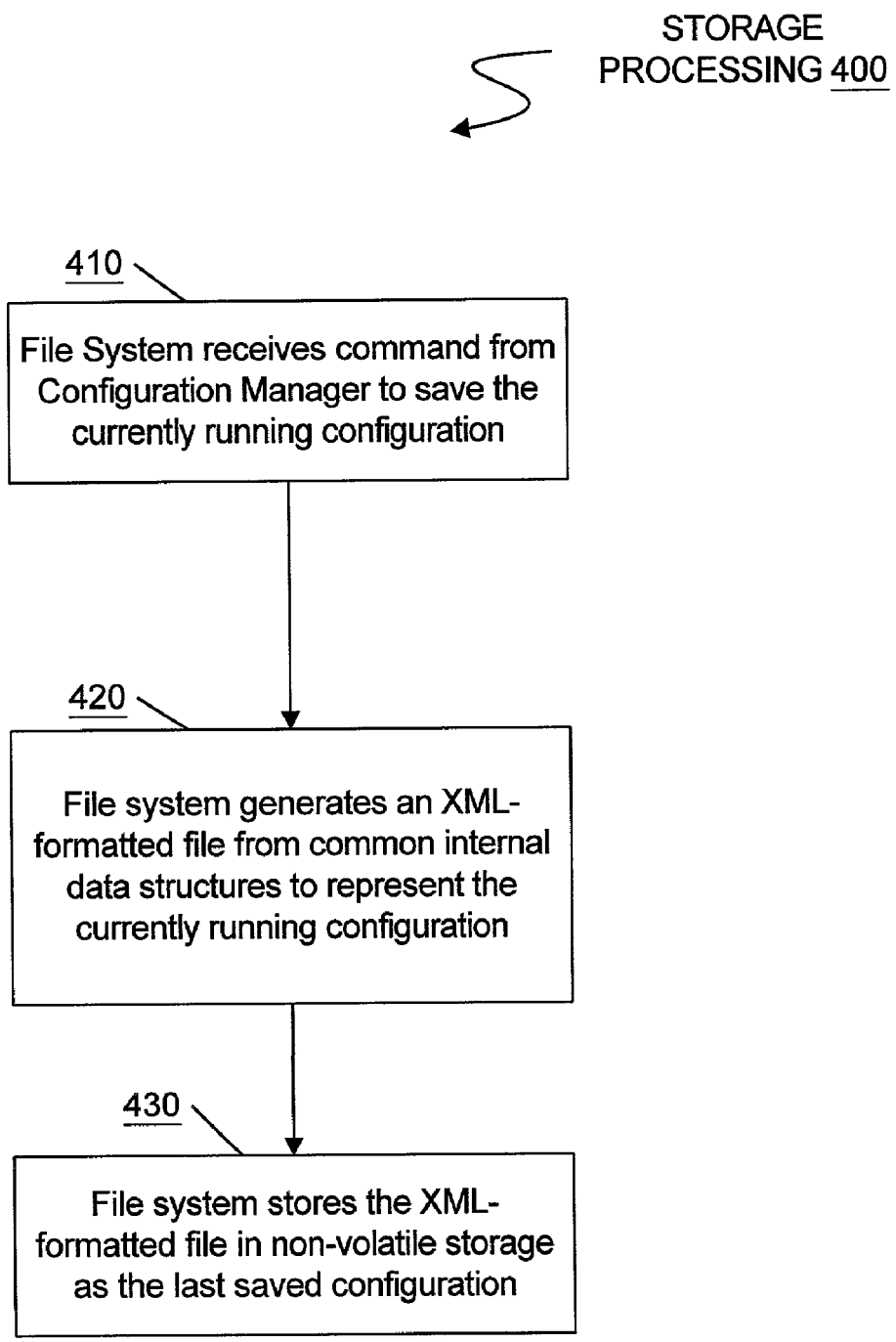
FIG. 4 is a flow diagram illustrating certain aspects of a method to be performed by a computer executing one embodiment of the illustrated invention shown in FIGS. 1-3.
Figure 5:
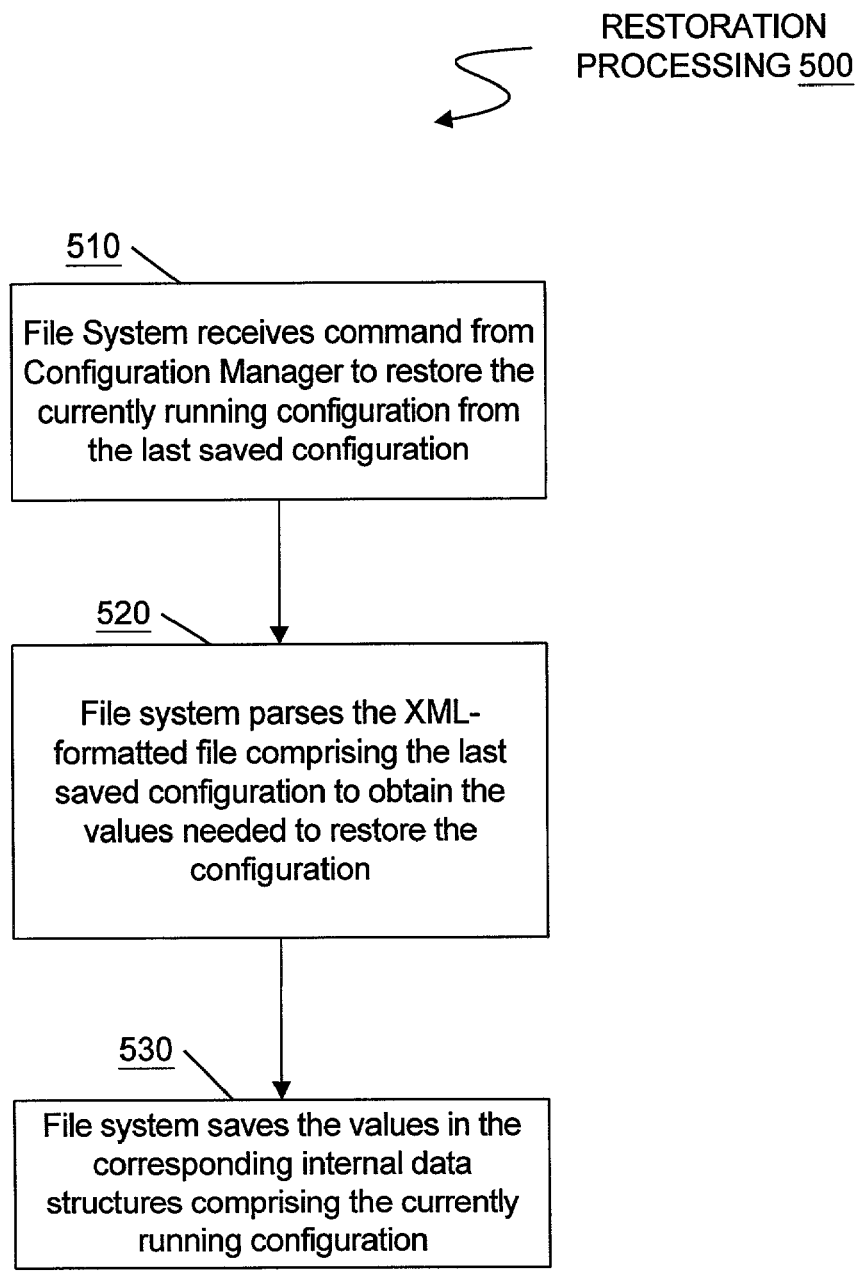
FIG. 5 is a flow diagram illustrating certain other aspects of a method to be performed by a computer executing one embodiment of the illustrated invention shown in FIGS. 1-3.

Turning now to FIGS. 4-5, the particular methods of the invention are described in terms of computer software with reference to a series of flowcharts. The methods to be performed by a processor on a router or other network device constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media).

It is understood by one skilled in the art that the computer-executable instructions may be written in a computer programming language or may be embodied in firmware logic such as an application-specific integrated circuit (ASIC). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

FIG. 4 is a flow diagram illustrating certain aspects of a method to be performed by a computer executing one embodiment of the illustrated invention shown in FIGS. 1-3. Specifically, FIG. 4 illustrates the storage processing 400 aspects of the file system 80, in which the currently running configuration 81 on a network device is saved onto a last saved configuration file 82 in a non-volatile storage area. At processing block 410, the file system 80 receives a command from the configuration manager 70 to save the currently running configuration. The command may be initiated on-demand through a network manager using one of the management interfaces, such as a command line interface (CLI), or it may be automatically initiated on schedule by the configuration manager 70 in accordance with a pre-determined schedule. Either way, at processing block 420, the file system 80 generates an XML-formatted file from the common internal data structures 74, whose content reflects the currently running configuration. The generation of the XML-formatted file may vary from one device, or one vendor to the next, since it depends upon the particular mapping of the common internal data structures 74 to the XML tags and values that comprise the XML-formatted file. Once generated, however, the XML-formatted file is a standard representation of the configuration that could even be ported from one network device to another, even when the other device uses a different common internal data structure 74.

In one embodiment, at processing block 430, the file system 80 completes the storage processing 400 by storing the generated XML-formatted file into a non-volatile storage area. The stored file now represents the last saved configuration of the network device, and can be used to restore the configuration of the device on demand.

FIG. 5 is a flow diagram illustrating certain other aspects of a method to be performed by a computer executing one embodiment of the illustrated invention shown in FIGS. 1-3. Specifically, FIG. 5 illustrates the restoration processing 500 aspects of the file system 80, in which the currently running configuration 81 on a network device is restored from the last saved configuration file 82. At processing block 510, the file system 80 receives a command from the configuration manager 70 to restore the currently running configuration. The command may be initiated on-demand through a network manager using one of the management interfaces, such as a command line interface (CLI), or it may be automatically initiated on schedule by the configuration manager 70 in accordance with a pre-determined schedule. For example, the command to restore the configuration may be issued as part of a network device startup routine. Either way, at processing block 520, the file system 80 parses the XML-formatted file 83 that represents the last saved configuration 82 to obtain the XML values needed to restore the configuration data. At processing block 530, the file system 80 saves the parsed XML values and maps the values into corresponding portions of the common internal data structures 74 in accordance with the XML tags. Once all the XML values are mapped to the common internal data structures 74, the currently running configuration is restored in volatile memory, and the network device may be restarted.

Figure 6:
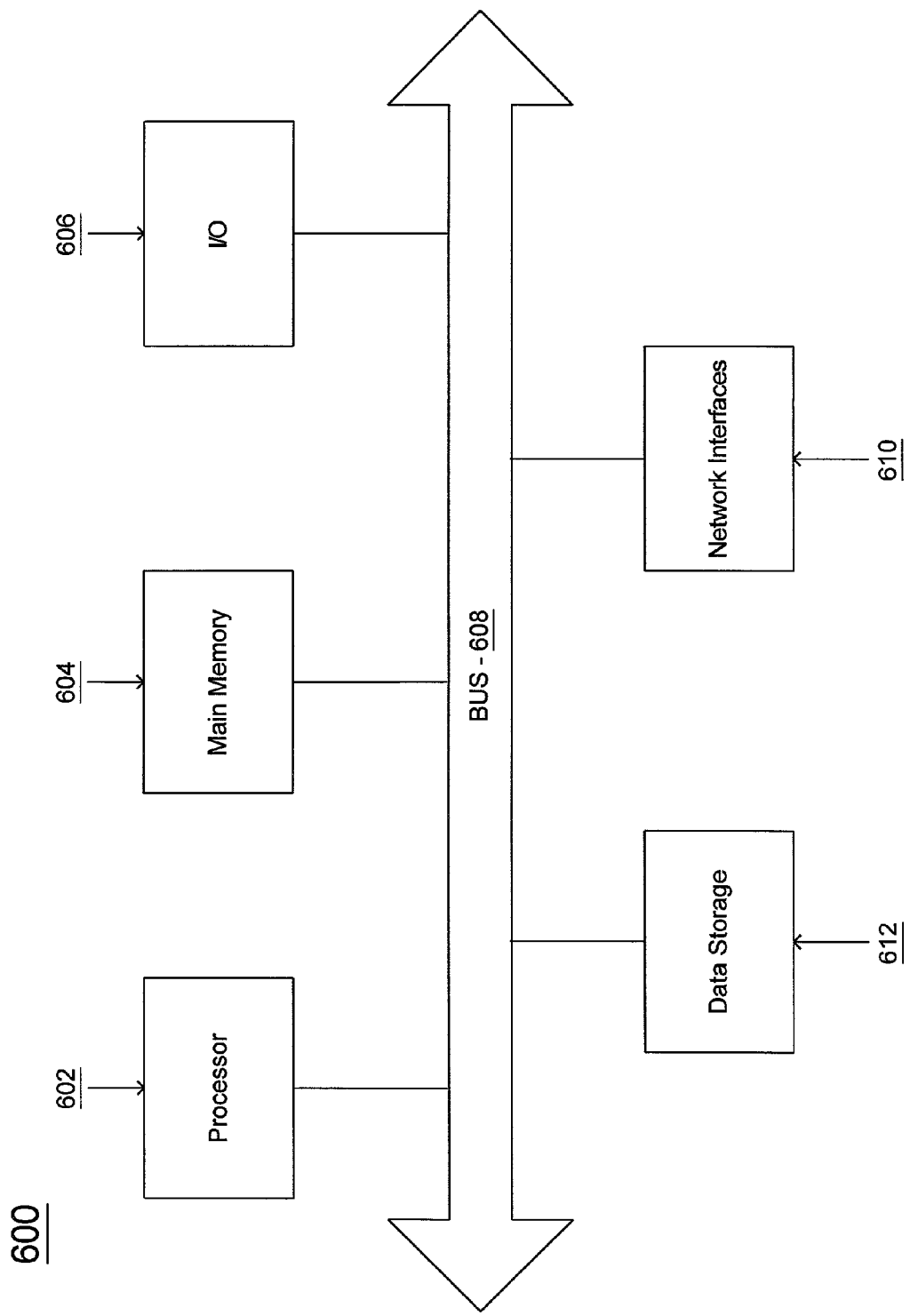
FIG. 6 is a block diagram illustrating a suitable computing environment in which certain aspects of the illustrated invention shown in FIGS. 1-5 may be practiced.

FIG. 6 is a block diagram illustrating a suitable computing environment in which certain aspects of the illustrated invention shown in FIGS. 1-5 may be practiced. In one embodiment, the method for a configuration restoration system 100 may be implemented on a computer system 600 having components 601-606, including a processor 601, a memory 602, an Input/Output device 603, a data storage 604, and a network interface 605, coupled to each other via a bus 608. The components perform their conventional functions known in the art and provide the means for implementing the configuration management system 600. Collectively, these components represent a broad category of hardware systems, including but not limited to general purpose computer systems and specialized packet forwarding devices.

In one embodiment, the memory component 602, may include one or more of random access memory (RAM), volatile memory, and non-volatile storage devices (e.g., magnetic or optical disks) on which are stored instructions and data for use by processor 601, including the instructions and data that comprise the currently running configuration 81, the last saved configuration, the configuration manager 70, as well as the other components of the configuration restoration system 100.

In one embodiment, the data storage component 604 may represent the configuration file system 80 managed by the configuration manager 70 and the configuration restoration system 100, and any other storage areas such as buffers, etc., used by the protocols 45, applications 55, or other interfaces 65.

It is to be appreciated that various components of computer system 600 may be rearranged, and that certain implementations of the present invention may not require nor include all of the above components. Furthermore, additional components may be included in system 600, such as additional processors (e.g., a digital signal processor), storage devices, memories, network/communication interfaces, etc.

In the illustrated embodiment of FIG. 6, the method and apparatus for a configuration restoration system 100 in accordance with one embodiment of the invention may be implemented as a series of software routines executed by computer system 600. The software routines may comprise a plurality or series of instructions, code sequences, configuration information, or other data to be accessed and/or executed by a processing system such as one or more of processor 601. Initially, the series of instructions, code sequences, configuration information, or other data may be stored on a data storage 604 and transferred to memory 602 via bus 608. It is to be appreciated that the series of instructions, code sequences, configuration information, or other data can be stored a data storage 604 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 605. The instructions, code sequences, configuration information, or other data may be copied from the data storage 604, such as mass storage, or from the propagated data signal into a memory 602 and accessed and executed by processor 601.

In alternate embodiments, the present invention is implemented in discrete hardware or firmware. For example, one or more application specific integrated circuits (ASICs) could be programmed with some or all of the above-described functions of the present invention.

Accordingly, a novel method and apparatus is described in which a configuration restoration system 100 facilitates the storage and restoration of a configuration of a network device. From the foregoing description, those skilled in the art will recognize that many other variations of the present invention are possible. In particular, while the present invention has been described as being implemented in a network comprising configuration manager 70, file system 80, and related components, it should be noted that some of the logic described herein may be distributed in other components of a network device without departing from the scope of the present invention.

For example, embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for the configuration manager 70, file system 80 and related components of the configuration restoration system 100 may be stored on the machine-accessible medium. In addition, the configuration commands, requests, configuration data, common internal data structures, actions, parameters, XML tags and values and associated other data may be stored in an internal storage area or on an external storage medium that is machine-accessible. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. In a network router operating within a Local Area Network (LAN), a method comprising:

accessing, via a configuration manager that operates from within the network router, a device independent data structure stored in a non-volatile memory of the network router and communicatively interfaced with the configuration manager, the device independent data structure comprising operational parameters for the network router, wherein the device independent data structure conforms to a standardized markup language and is not device-specific or vendor-specific;

accessing, via the configuration manager of the network router, an internal memory structure stored in a volatile memory of the network router and communicatively interfaced with the configuration manager, wherein the common internal data structure is a proprietary device-specific data structure whose contents represent the then currently running configuration of the network router;

mapping, via a Universal Management Object Layer (UMOL) of the network router that is communicatively interfaced with the configuration manager and operates in conjunction with the configuration manager, the operational parameters accessed from the device independent data structure to the currently running configuration in the internal memory structure;

re-populating, via the UMOL of the network router in conjunction with the configuration manager, the operational parameters for the network router accessed from the device independent data structure into corresponding locations within the proprietary device-specific data structure based upon the mapping of the operational parameters to the currently running configuration; and wherein re-populating the operational parameters comprises restoring the currently running configuration of the network router from the device independent data structure stored in the non-volatile memory of the network router without having to re-process a plurality of commands used to originally generate the currently running configuration of the network router;

modifying one or more operational parameters of the currently running configuration responsive to command input received at the network router;

mapping the modified operational parameters of the currently running configuration to the device independent data structure;

modifying the device independent data structure stored in the non-volatile memory of the network router by loading the modified operational parameters of the currently running configuration directly into the device independent data structure; and storing the modified device independent data structure in the non-volatile memory of the network router, wherein the modified device independent data structure reflects the modifications made to the currently running configuration responsive to the command input, and wherein the modified device independent data structure to be later restored to the network router as the currently running configuration, or sent to a second network router to be loaded as a new active currently running configuration for the second network router, or both.

2. The method of claim 1, further comprising:

receiving a second device independent data structure comprising new operational parameters from a second network router;

mapping the new operational parameters of the second device independent data structure to the currently running configuration in the internal memory structure; and populating the new operational parameters of the second device independent data structure directly into the currently running configuration in the internal memory structure based on the mapping of the new operational parameters to the currently running configuration.

3. The method of claim 2, wherein the first network router and the second network router are of different vendor types.

4. The method of claim 1, wherein re-populating the operational parameters comprises one of:

re-populating the operational parameters responsive to a startup routine for the network router;

re-populating the operational parameters prior to a restart of the network router to make the re-populated operational parameters active in the network router;

re-populating the operational parameters automatically in accordance with a pre-determined schedule; and re-populating the operational parameters responsive to an external command received at the configuration manager of the network router.

5. The method of claim 1, further comprising:

mapping the re-populated operational parameters of the currently running configuration to the device independent data structure;

loading the operational parameters of the currently running configuration directly into the device independent data structure; and sending the device independent data structure to a second network router for use by the second network router to load as a new active currently running configuration.

6. The method of claim 1, wherein the operational parameters of the device independent data structure comprises a plurality of parameter-value pairs, and wherein mapping the operational parameters of the device independent data structure to the currently running configuration in the internal memory structure comprises mapping data values within the parameter-value pairs to locations in the internal memory structure.

7. The method of claim 1, wherein the device independent data structure is formatted in accordance with an Extensible Markup Language ("XML") convention.

8. A network router operating in a Local Area Network (LAN) and having instructions stored thereon that, when executed by a processor, cause the network router to perform a method comprising:

accessing, via a configuration manager that operates from within the network router, a device independent data structure stored in a non-volatile memory of the network router and communicatively interfaced with the configuration manager, the device independent data structure comprising operational parameters for the network router, wherein the device independent data structure conforms to a standardized markup language and is not device-specific or vendor-specific;

accessing, via the configuration manager of the network router, an internal memory structure stored in a volatile memory of the network router and communicatively interfaced with the configuration manager, wherein the common internal data structure is a proprietary device-specific data structure whose contents represent the then currently running configuration of the network router;

mapping, via a Universal Management Object Layer (UMOL) of the network router that is communicatively interfaced with the configuration manager and operates in conjunction with the configuration manager, the operational parameters accessed from the device independent data structure to the currently running configuration in the internal memory structure;

re-populating, via the UMOL of the network router in conjunction with the configuration manager, the operational parameters for the network router accessed from the device independent data structure into corresponding locations within the proprietary device-specific data structure based upon the mapping of the operational parameters to the currently running configuration; and wherein re-populating the operational parameters comprises restoring the currently running configuration of the network router from the device independent data structure stored in the non-volatile memory of the network router without having to re-process a plurality of commands used to originally generate the currently running configuration of the network router;

modifying one or more operational parameters of the currently running configuration responsive to command input received at the network router;

mapping the modified operational parameters of the currently running configuration to the device independent data structure;

modifying the device independent data structure stored in the non-volatile memory of the network router by loading the modified operational parameters of the currently running configuration directly into the device independent data structure; and storing the modified device independent data structure in the non-volatile memory of the network router, wherein the modified device independent data structure reflects the modifications made to the currently running configuration responsive to the command input, and wherein the modified device independent data structure to be later restored to the network router as the currently running configuration, or sent to a second network router to be loaded as a new active currently running configuration for the second network router, or both.

9. The method of claim 8, further comprising:
receiving a second device independent data structure comprising new operational parameters from a second network router;
mapping the new operational parameters of the second device independent data structure to the currently running configuration in the internal memory structure; and
populating the new operational parameters of the second device independent data structure directly into the currently running configuration in the internal memory structure based on the mapping of the new operational parameters to the currently running configuration.

10. The method of claim 9, wherein the first network router and the second network router are of different vendor types.

11. The method of claim 8, wherein re-populating the operational parameters comprises one of:
re-populating the operational parameters responsive to a startup routine for the network router;
re-populating the operational parameters prior to a restart of the network router to make the re-populated operational parameters active in the network router;
re-populating the operational parameters automatically in accordance with a pre-determined schedule; and
re-populating the operational parameters responsive to an external command received at the configuration manager of the network router.

12. The method of claim 8, further comprising:
mapping the re-populated operational parameters of the currently running configuration to the device independent data structure;
loading the operational parameters of the currently running configuration directly into the device independent data structure; and
sending the device independent data structure to a second network router for use by the second network router to load as a new active currently running configuration.

13. The method of claim 8, wherein the operational parameters of the device independent data structure comprises a plurality of parameter-value pairs, and wherein
mapping the operational parameters of the device independent data structure to the currently running configuration in the internal memory structure comprises mapping data values within the parameter-value pairs to locations in the internal memory structure.

14. The method of claim 8, wherein the device independent data structure is formatted in accordance with an Extensible Markup Language ("XML") convention.

* * * * *